March 27, 1956  F. S. GOULDING  2,740,091
MEANS FOR MEASURING TIME INTERVALS
Filed March 2, 1953  3 Sheets-Sheet 2
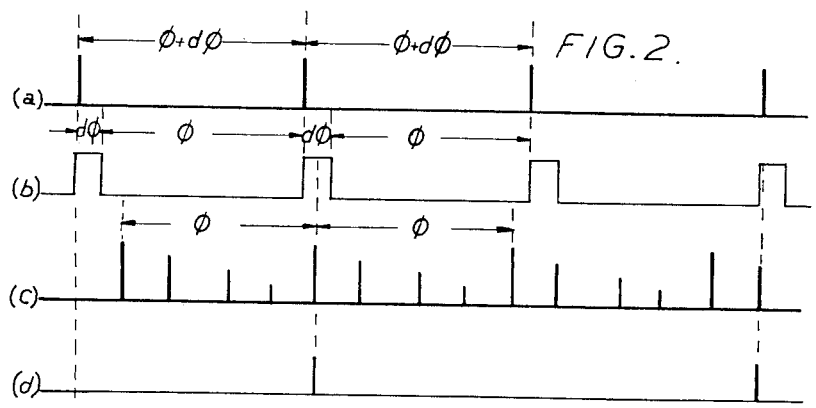
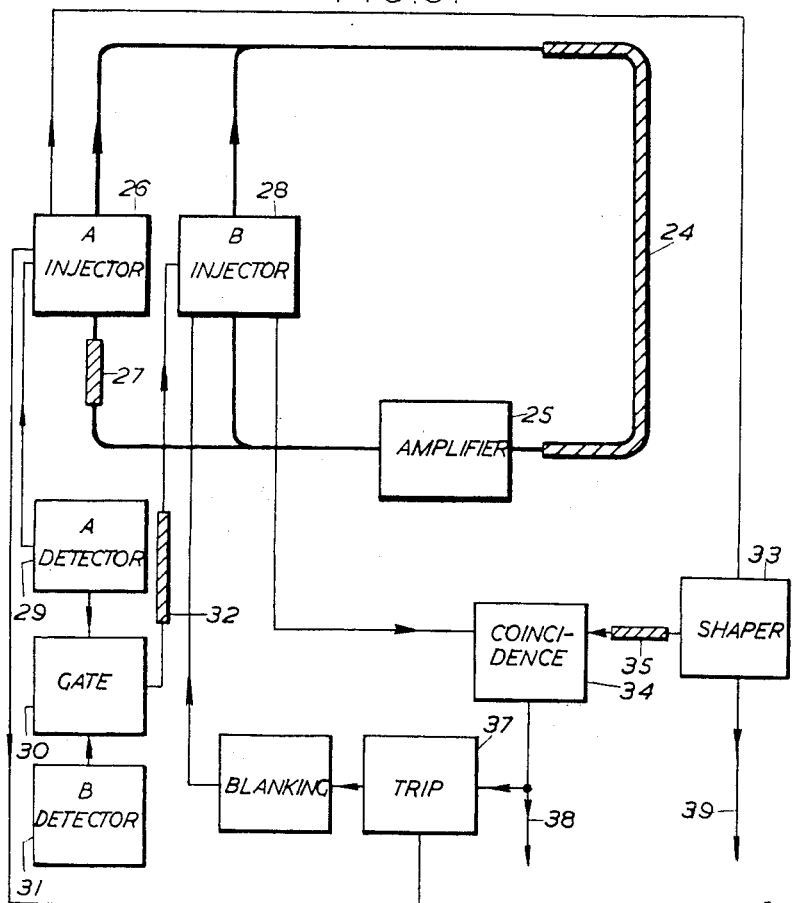
Inventor
FREDERICK SIDNEY GOULDING,
By
Attorney March 27, 1956  F. S. GOULDING  2,740,091
MEANS FOR MEASURING TIME INTERVALS
Filed March 2, 1953  3 Sheets-Sheet 3

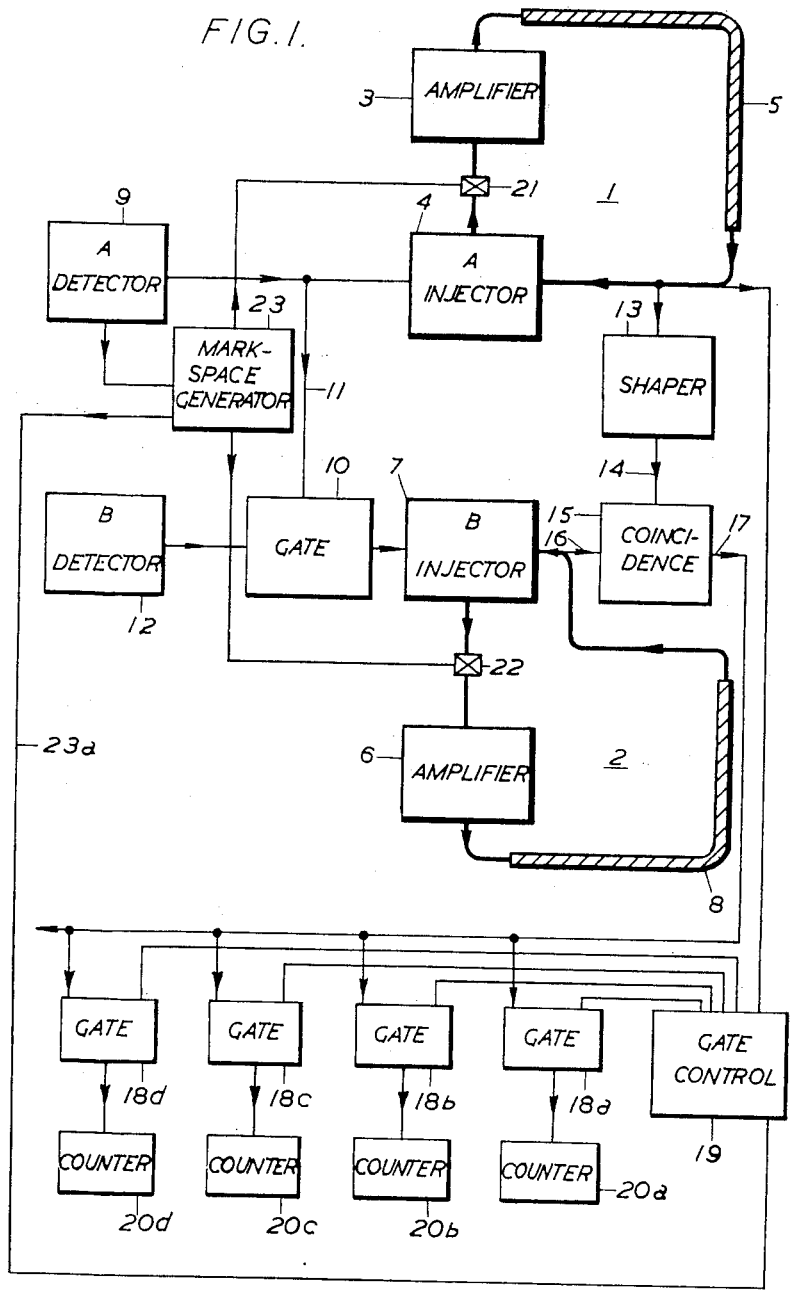

Inventor
FREDERICK SIDNEY GOULDING,
By
Attorney

United States Patent Office 2,740,091
Patented Mar. 27, 1956

2,740,091

MEANS FOR MEASURING TIME INTERVALS

Frederick S. Goulding, Deep River, Ontario, Canada, assignor to The National Research Development Corporation, London, England Application March 2, 1953, Serial No. 339,737

6 Claims. (Cl. 324—68)

This invention relates to means for measuring time intervals and to the sorting of events in channels according to their time delay from an initial event or reference time. The invention specifically relates to means for amplifying a time scale so that events occurring in that scale can be handled with greater time resolution.

In time sorting problems one is generally concerned with two types of event; these are identified for convenience as A and B type events. The B type events occur as a direct consequence of the A events and one is generally interested in knowing the probability of a B event occurring with a certain specific time delay on the A event. One example of the use of a time sorter occurs in time of flight neutron spectrometry where the A event is, in fact, an event causing a group of neutrons to be emitted simultaneously from a neutron source and the B events are the signals received from a neutron detector placed at a point a measured distance away from the neutron source. The time of flight of the neutrons from source to detector is then a measure of the energy of the neutrons. Inter-position of a sample in the path of the neutrons modifies the time distribution of signals from the neutron detector and, from measurements of the changes so produced, information on the neutron scattering and absorption properties of the sample may be determined. Another example of the use of a time sorter is for the measurement of delayed coincidences for radioactivity half life measurements. Certain active nuclei have the property of decaying by the emission of an initial particle to provide a new neuclus which being in an excited state, settles down a short time later by the emission of a photon. The first emission may be detected as an A event and the further emission as a B event. The mean time delay between A and B events may be interpreted in terms of the statistical probability of the existence of the particular excited state in the final nucleus. Time interval measurement is common in the radar field.

The usual form of time sorter comprises a delay unit which produces a pulse at a known time T after the A event. This pulse opens a first recording gate (or channel). After a short delay time $t$ this channel is closed by another pulse from the delay unit and at the same time a second gate is opened. After a further delay $t$, the second gate is closed and the third opened etc. The B events, recorded as electrical signals, are then routed to all channels, but they only pass through the particular channel which happens to be open at their time of arrival. Thus the recorders on the output of the channels present a spectrum of the time distribution of B pulses in the interval T to $T+Nt$ (N being the number of channels) after the A event.

It is obvious that the accuracy with which the instrument is able to measure the time of arrival of a B event after an A event is limited to the channel width $t$. As a general rule $t$ is small compared with the additional delay T, and the time of arrival of a B event (i. e. $T+nt$ where $n$ is the number of the channel in which the event is registered) is known with reasonable accuracy. However, much effort is being directed to the measurement of short half lives and to the determination of the time of flight of high speed neutrons, and, in either case, the value of $T+nt$ is small. In order to improve the resolution it is essential that the value of $t$ should be kept small.

Thus, work including small values of T requires the reduction of the time $t$ for which a channel remains open. The switching characteristics of electronic trip circuits limit the extent to which it is possible to reduce $t$.

The uncertainties (jitter, delay etc.) which occur on the opening and closing of gates must be small compared with the total open time of $t$ of any gate. With conventional circuits the jitter, delay etc., amount to something of the order of 0.1 μsec. and it may be seen that this limits $t$ to values in excess of, say, 1 μsec. The usual circuits can be improved, but the improvements will result in three undesirable results:

(1) Faster circuits are generally more complicated with consequent servicing difficulties.

(2) The speed of the circuit depends on the power taken from the H. T. line, other things being constant. This implies heavy current drains for high speeds.

(3) Quite often the setting up of very fast circuits is critical—principally due to the effect of tolerances in components etc.

To overcome these difficulties and to allow the use of normal circuits for small values of $t$, the following scheme may be used:

(a) Store the signals in some form of storage at their normal rate of arrival.

(b) Examine the information in the store in such a way that the original time relationship of signals is preserved but the whole time scale is expanded by a factor which allows the resulting output signals to be fed into a normal slow switched gating system.

One limitation of such a system may immediately be appreciated. Obviously, if a time expansion factor of F is required, if N is the number of gates and if $r$ is the time for which each gate of the slow gating system is open, then the A events must be constrained to appear at such a rate that the interval between two A events is not less than N$r$. The actual interval in the time spectrum of B events which is being observed is $$\frac{Nr}{F}$$

Thus, there is a wastage of time of at least $$Nr\left(1-\frac{1}{F}\right)$$

this wastage being used for reading back the stored information. However, one is not necessarily concerned with high rates of arrival of A pulses, and this limit is not always important.

One system of carrying out this time expansion is to use a C. R. T. storage system similar to that described by F. C. Williams (Proc. I. E. E., vol. 96, No. 40, March 1949). In this system a fast time base sweep is triggered by the A event and the received B signals are writtten as charge on the C. R. T. screen. A short time later the tube is rescanned at a slower rate and the original stored pattern is read out in the normal manner. The speed of the reading trace is adjusted to give the correct expansion factor. The difficulties with this system are two fold:

(a) For preservation of the true time relationship, the reading trace and writing trace must be exactly linear or must show the same non-linearities.

(b) The power supplies and circuits involved are complex and it has been shown that such a system, for a 100 gate expander with $r=2$ μsec.; $F=10$, would require approximately 100 valves. This means that each of the 100 slow gates requires effectively 1 additional valve in order to produce a system with a resolving time of 0.2 μsec.

The invention avoids both these difficulties; for example, the number of valves required for $N=100$ $r=2$ μsec. $F=10$, is twenty and the original time sequence is automatically preserved.

The invention consists in apparatus for sorting pulses, which are secondary to an initial pulse, into channels according to their time occurrence from the initial pulse comprising means for repeating the secondary pulses at one recurrence frequency, means for repeating the initial pulse at a different recurrence frequency, means for mixing the recurring initial pulse with the recurring secondary pulses, means for detecting coincidences between the mixed pulses and means for sorting the coincidences into channels according to their time occurrence.

The invention also consists in apparatus for sorting a series of pulses according to their individual times of occurrence comprising means for causing the series to recur, means for mixing therewith, a recurrent single pulse of time width $d\phi$ having a recurrence period difference $d\phi$ from the recurrence period of the series to be sorted, means for detecting coincidences between pulses and gates opened serially to sort the coincidences into channels according to their time occurrence.

The invention also consists in apparatus for sorting pulses which are secondary to an initial pulse into channels according to their time occurrence from the initial pulse comprising a first circulating delay line for the initial pulse and a second circulating delay line for the secondary pulses having a delay time different from that of the first line, a connection from the first delay line to a pulse widening circuit having a connection to one input of a coincidence circuit and a connection from the second delay line to another input of the coincidence circuit, a connection from the output of the coincidence circuit to channels each comprising a gate, and means for opening and closing said gates in sequence.

When apparatus according to the invention is used for sorting pulses secondary to a series of initial pulses, means are provided to clear each recurring initial pulse and its secondary pulses before the next initial pulse and its secondary pulses are fed to the apparatus. This means may take the form of a "mark-space" generating unit having a period determined by the occurrence of initial events.

The invention also consists in apparatus for expanding the time scale of a series of pulses comprising means for repeating the series, means for generating a reference pulse of duration much shorter than that of the series, means for repeating the reference pulse at a different rate from the repetitive rate of the series, means for mixing the repetitive reference pulse with the repetitive series of pulses whereby the reference pulse becomes coincident with each pulse in the series once only, and means for detecting the coincidences.

Various forms of the invention are now described with reference to the accompanying drawings wherein:

Fig. 1 is a block schematic circuit diagram of one form of the invention using separate delay lines.

Fig. 2 shows waveforms in the circuit of Fig. 1.

Fig. 3 is a block schematic circuit diagram of one form of the invention using a delay line in common.

Figure 4:
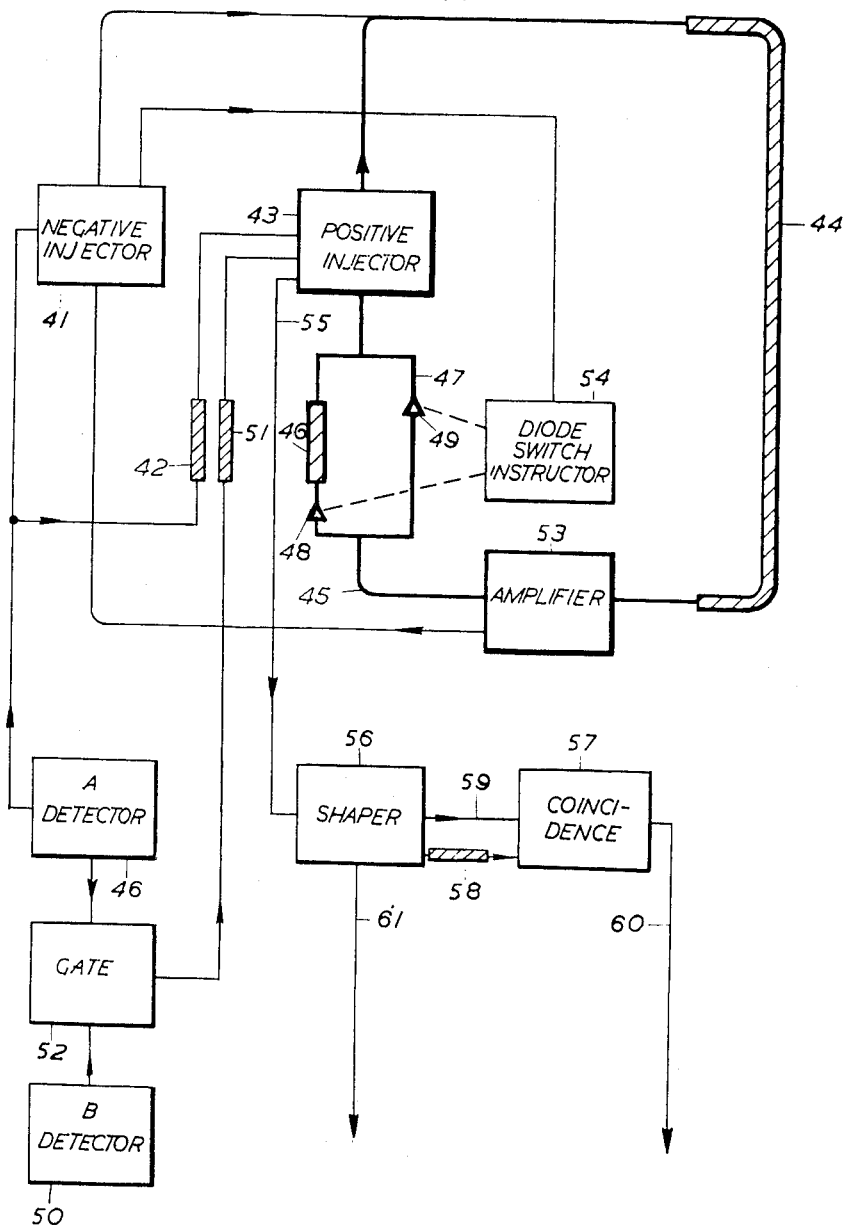
Fig. 4 is a block schematic circuit diagram of another form of the invention using a delay line in common.

In Fig. 1 there are circulating delay line systems 1 and 2. System 1 has an amplifier 3, and an injector circuit 4 and a delay line 5. The total delay time in this loop is $\phi+d\phi$. System 2 has an amplifier 6, and injector circuit 7 and a delay line 8. Its total delay time is taken as $\phi$. A pulses are connected to circuit 4 from the detector 9 and B pulses are connected to circuit 7 from the gate 10. The gate 10 is opened by each A pulse through connection 11 and stays open for a time slightly less than $\phi$. B pulses from the detector 12 are fed through the gate 10. The A pulse circulating around delay system 1 is shown in Fig. 2(a) while B pulses circulating in system 2 are shown in Fig. 2(c). (For convenience the A and B pulses are assumed to be of very small duration. In practice use of the front edges of wider pulses makes this assumption allowable.) The shaper circuit 13 squares and broadens the A pulse to a width $d\phi$ so that an input 14 of the coincidence circuit 15 experiences pulses of the form shown in Fig. 2(b) and the other input 16 experienced pulses as shown in Fig. 2(c). The output 17 of the coincidence circuit produces pulses as shown in Fig. 2(d) when pulses at inputs 14 and 16 occur simultaneously. The output pulses, which are, of course, the B pulses on an expanded time scale are fed to gates 18a and 18b etc. These gates are opened and closed under the control of circuit 19 which draws its input pulses to effect control of the gates, from a convenient point in system 1. For example, the circuit 19 could draw its input from a point on the delay line 5; the point of opening and closing is not critical so long as it is ensured that each gate opens in anticipation of the periods $d\phi$ shown in Fig. 2(b). Counters 20a, 20b etc. sum up the total number of pulses passing through gates 18a, 18b etc. respectively. Blocking points 21 and 22 in the delay line systems 1 and 2 respectively are controlled by the mark-space generator 23 in such a way as to clear all pulses from the lines preceding the arrival of the next A pulse at the A detector. The gate control circuit is synchronised with the generator 23 through connection 23a.

Taking a typical case $\phi$ may be 20 μsec. $d\phi=0.2$ μsec. If a B signal is injected at the input 0.7 μsec. after the A event was injected, then the coincidence output will occur when A reaches its injector at the end of the 3rd cycle (i. e. 60 μsecs. later). If, on the other hand the delay had been 1.1 μsec. the coincidence would occur at the end of the 5th cycle and so on (i. e. 100 μsecs. later). It will be noted that coincidences can only be recorded at intervals of 20.2 μsecs. This is a suitable speed at which to feed pulses, into a slow gating system.

Since $\phi=20$ μsecs. and $d\phi=0.2$ μsec., the maximum number of channels N which can be accommodated is obviously 100. This implies 100 cycles of 20.2 μsecs. duration, i. e. a total time of 2 m. sec. Allowing a small amount of time for clearing the information from the lines before the arrival of a second A pulse, it is clear that, using the above values for $\phi$, $d\phi$ and N, 2.5 m. sec. must be the minimum time between A events.

The system as described suffers from a disadvantage as it relies on the relative constancy of delay in two long lines. This can be avoided by employing a modified arrangement as shown in Fig. 3. The constructional problems are also reduced. In this modified arrangement the two delay lines have the major part in common so that any inconstancy affects both lines to substantially the same extent. The delay line system for the A and B pulses have a part consisting of line 24 (delay time $\phi$) and amplifier 25 in common, so that the A system comprises injector 26, line 24, amplifier 25 and short line 27 (delay time $d\phi$). The total delay time is $\phi+d\phi$. The B system comprises injector 28, line 24 and amplifier 25. As in Fig. 1, there is a detector 29 for A pulses feeding to the injector 26 and opening a gate 30 to allow B pulses received in detector 31 to pass to the injector 28. Also provision is made, but not shown, for a mark-space generator and blocking points as described in the previous system (Fig. 1). The A pulses are injected into the line 24 as positive pulses and the B pulses are injected as negative pulses, with a delay X set up by the short line 32. The A pulses also feed to a shaper 33 which feeds via short line 35, also of delay X, to one input of coincidence circuit 34. The other input to circuit 34 takes the B pulses from the B injector. As the A and B pulses are of opposite phase and as they use a common path it is essential to provide that the A pulse is not cancelled out by coincidence with a B pulse, or for that matter, that no unrecorded B pulse is lost. To this end the delay line 32 is introduced. Delay line 35 gives a time restoration before the pulses reach the coincidence circuit.

A blanking circuit 36 and trip circuit 37 is included in this system in order to prevent interaction in the delay line 24 between the negative A pulse and any positive B pulse. The trip circuit 37 trips when an output is obtained at coincidence circuit 34 and it is reset by the next A pulse from injector 26. On the back edge of this trip circuit waveform a short square is formed which is applied through the blanking circuit 36 to the B injector 28 in such a way as to prevent the B pulse which registered the coincidence on the previous cycle from being regenerated. Thus, once a B pulse has registered a coincidence it is removed from the circulating system. The gates and counters in the circuit are not shown; connection 38 is similar to connection 17 of Fig. 1 and it leads to gates and counters and connection 39 leads to a control circuit such as circuit 19 of Fig. 1.

The difference in the time delay per cycle in the two paths is determined by two elements. One element is the delay line 27 and the constancy of delay in this element should be very good. The other element is the relative triggering delay times between injectors 26 and 28. Any delay between triggering is multiplied as recycling to the delay line progresses and this results in a large relative delay in the later cycles.

The relative delay per cycle may be reduced to about 2 m. μsecs. by using secondary emission trigger circuits but this corresponds to an error of 0.2 μsecs. after 100 cycles.

The circuit now described with reference to Fig. 4 is designed to avoid the larger of the two errors referred to above in relation to Fig. 3. It is also a simpler circuit than either of those disclosed with reference to Figs. 1 and 3 in that less components are used.

The pulses from the A detector 46 are fed to a negative injector circuit 41 and via a delay line 42, having a delay time Y, to a positive injector circuit 43. Both injectors feed into a common delay line 44 having a delay time $\phi$. Associated with the circuit 43 there is a switched path 45 branching on the one hand through a delay line 46 having a delay time $d\phi$ and on the other hand through the connection 47. Switching is performed by diode switches 48, 49, controlled by the negative injector circuit 41 through diode switch instructor circuit 54. The instruction given to the switches is to pass the next pulse only through switch 48 and the following pulses through switch 49. In this way the A pulses are given a circulation relay of $\phi+d\phi$ and the B pulses are given a delay of $\phi$. B pulses from the detector 50 are gated by gate 52 and fed to injector circuit 43 after passing through a delay line 51 of delay time X. An amplifier 53 is provided for all pulses circulating through the delay line 44. An output 55 is taken from circuit 43 and the pulses in output 55 are shaped in circuit 56 and passed to a coincidence circuit 57, one path to circuit 57 being provided by delay line 58 of delay time (X−Y) and the other path by connection 59. Connection 60 and 61 lead away from the coincidence circuit and shaper respectively and the remainder of the circuitry associated with these connections is as shown in Fig. 1 in relation to connection 17 and circuit 19. In the operation of this circuit an A pulse circulates via injector 41, delay line 44, and amplifier 53 and sets switches 48, 49 so that a path through switch 48 is prepared for the delayed A pulse. When the delay A pulse has passed, the switches 48, 49 are set so that the following B pulses pass via switch 49. When a coincidence is registered by 57 the B pulse of that coincidence is eliminated so that the picture in any cycle in the delay line consists of the A pulse (negative), followed by a delayed A pulse (positive) followed by what is left of the B pulses (positive). By using the arrangement of switches 48 and 49, the only unwanted time delay between the B pulse channel and the delayed A pulse channel is that due to the switches. This delay may be made very small and moreover it remains relatively constant. It may therefore be allowed for by adjusting the delay line 46.

I claim:

1. Apparatus for sorting a series of pulses secondary to an initial pulse into channels according to the time occurrence of the pulses relative to the initial pulse comprising means for repeating the secondary pulse series at one recurrence frequency, means for repeating the initial pulse at a different recurrence frequency, means for mixing the recurring initial pulse with the recurring secondary pulse series, means for detecting coincidences between the mixed pulses and means for sorting the coincidences into channels according to their time occurrence.

2. Apparatus according to claim 1 having means for clearing all pulses from the apparatus before the arrival of the next initial pulse.

3. Apparatus for sorting a series of pulses into channels according to the time of occurrence of the pulses comprising means for causing the series to recur regularly, means for mixing therewith a single pulse made to recur with a period different from the period of recurrence of the series of pulses by an amount equal to the width of the single pulse, means for detecting coincidences between the single pulse and the pulses in the series of pulses and gates opened serially in time to sort the coincidences into channels according to their time occurrence.

4. Apparatus for sorting a series of pulses secondary to an initial pulse into channels according to time occurrence of the pulses relative to the initial pulse comprising a first circulating delay line for the initial pulse and a second circulating delay line for the secondary pulse series having a delay time different from that of the first line, a connection from the first delay line to a pulse widening circuit having a connection to one input of a coincidence circuit and a connection from the second delay line to another input of the coincidence circuit, a connection from the output of the coincidence circuit to channels each comprising a gate, and means for opening and closing said gates in sequence.

5. Apparatus for expanding the time scale of a series of pulses comprising means for repeating the series, means for generating a reference pulse of duration much shorter than that of the series, means for repeating the reference pulse at a different rate from the repetitive rate of the series, means for mixing the repetitive reference pulse with the repetitive series of pulses whereby the reference pulse becomes coincident with each pulse in the series once only, and means for detecting the coincidences.

6. Apparatus for sorting a series of events, each series being secondary to an initial event, into channels according to their time delay from their respective initial events comprising a detector for the initial events and a detector for the secondary events producing initial and secondary electrical pulses respectively, means for repeatedly circulating each initial pulse through a long delay line in one polarity, means for deriving delayed initial pulses, means for repeatedly circulating each delayed initial pulse through the long delay line in opposite polarity, means for circulating the secondary pulses also of opposite polarity through the long relay line with a delay greater than that given to the delayed initial pulses, switch means operated by each cycle of an initial pulse through the long delay line to divert the delayed initial pulse through a short delay line without diverting the initial pulse or secondary pulses through that short delay line, means for detecting coincidences between the delayed initial pulse and secondary pulses, means for cancelling from the long delay line each secondary pulse rendered coincident, counters for counting the coincidences and means for opening and closing the connections to the counters in turn so that each counter records the number of secondary pulses occurring at a fixed time interval after their respective initial pulses.

References Cited in the file of this patent

UNITED STATES PATENTS

| | | |
|---|---|---|
| 2,199,634 | Koch | May 7, 1940 |
| 2,478,919 | Hansell | Aug. 16, 1949 |
| 2,482,974 | Gordon | Sept. 27, 1949 |
| 2,590,057 | Wiegand | Mar. 18, 1952 |

FOREIGN PATENTS

| | | |
|---|---|---|
| 635,476 | Great Britain | Apr. 12, 1950 |